(12) United States Patent
Hozono

(10) Patent No.: US 12,613,408 B2
(45) Date of Patent: Apr. 28, 2026

(54) LASER SCANNING UNIT AND MANUFACTURING METHOD OF LASER SCANNING UNIT

(71) Applicant: KYOCERA Document Solutions Inc., Osaka (JP)

(72) Inventor: Tomohide Hozono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 252 days.

(21) Appl. No.: 18/666,407

(22) Filed: May 16, 2024

(65) Prior Publication Data

US 2024/0385430 A1 Nov. 21, 2024

(30) Foreign Application Priority Data

May 19, 2023 (JP) ................................. 2023-083399

(51) Int. Cl.
| | |
|---|---|
| *G02B 26/12* | (2006.01) |
| *B41J 2/47* | (2006.01) |
| *G03G 15/04* | (2006.01) |
| *G03G 15/043* | (2006.01) |

(52) U.S. Cl.
CPC .............. *G02B 26/12* (2013.01); *B41J 2/471* (2013.01); *G03G 15/04036* (2013.01); *G03G 15/0435* (2013.01)

(58) Field of Classification Search
CPC ... G02B 26/12; B41J 2/471; G03G 15/04036; G03G 15/0435
See application file for complete search history.

(56) References Cited

U.S. PATENT DOCUMENTS

| | | | | |
|---|---|---|---|---|
| 2002/0001408 A1* | 1/2002 | Takase | .................. | G02B 26/12 382/162 |
| 2018/0095241 A1* | 4/2018 | Ishidate | ................. | G02B 26/12 |
| 2019/0163088 A1 | 5/2019 | Taniyama et al. | | |

FOREIGN PATENT DOCUMENTS

JP 2019101160 A 6/2019

\* cited by examiner

*Primary Examiner* — James A Dudek
(74) *Attorney, Agent, or Firm* — Alleman Hall LLP

(57) ABSTRACT

A mirror fastener fastens a first end portion of a mirror to a first mirror support portion of a housing. A second mirror support portion includes a pair of partitioning surfaces and a concave surface. The pair of partitioning surfaces oppose an end surface of a second end portion of the mirror while an interval is provided between the pair of partitioning surfaces and the end surface. The concave surface is formed between the pair of partitioning surfaces and opposes the end surface of the second end portion while an interval larger than the interval between the pair of partitioning surfaces and the end surface is provided between the concave surface and the end surface. An adhesive bonds the end surface of the second end portion and the pair of partitioning surfaces.

6 Claims, 5 Drawing Sheets

LASER SCANNING UNIT AND MANUFACTURING METHOD OF LASER SCANNING UNIT

INCORPORATION BY REFERENCE

This application is based upon and claims the benefit of priority from the corresponding Japanese Patent Application No. 2023-083399 filed on May 19, 2023, the entire contents of which are incorporated herein by reference.

BACKGROUND

The present disclosure relates to a laser scanning unit in which one end of a mirror is bonded to a housing by an adhesive, and a manufacturing method of a laser scanning unit.

An image forming apparatus that uses electrophotography includes a photoconductor and a laser scanning unit. The laser scanning unit scans laser light onto a surface of the photoconductor. Thus, the laser scanning unit writes an electrostatic latent image on the surface of the photoconductor.

The laser scanning unit includes a housing, a scanner, a mirror, and a lens. The mirror is arranged inside the housing while a scanning direction of the laser light is set as a longitudinal direction.

An arrangement accuracy of the mirror largely affects an accuracy in writing the electrostatic latent image. For example, it is known that the mirror is supported by the housing at three positions.

In the case described above, a first end portion of the mirror in the longitudinal direction is supported at two positions, and a second end portion of the mirror in the longitudinal direction is supported at one position.

SUMMARY

A laser scanning unit according to an aspect of the present disclosure includes a housing, a laser scanner, a mirror, a mirror fastener, and an adhesive. The laser scanner is arranged inside the housing and scans laser light along a first direction. The mirror is arranged inside the housing along the first direction and reflects the laser light. The mirror fastener fastens a first end portion of the mirror on a first side of the first direction to a first mirror support portion of the housing. The adhesive bonds a second end portion of the mirror on a second side of the first direction to a second mirror support portion of the housing. The first mirror support portion includes a pair of protrusion portions which support two positions of a mirror specific surface that is a reflection surface or a surface on an opposite side of the reflection surface at the first end portion of the mirror. The second mirror support portion includes a pair of partitioning surfaces and a concave surface. The pair of partitioning surfaces oppose an end surface of the second end portion of the mirror while an interval is provided between the pair of partitioning surfaces and the end surface. The concave surface is formed between the pair of partitioning surfaces and opposes the end surface of the second end portion of the mirror while an interval larger than the interval between the pair of partitioning surfaces and the end surface is provided between the concave surface and the end surface. The adhesive bonds the end surface of the second end portion of the mirror and the pair of partitioning surfaces.

A manufacturing method of a laser scanning unit according to another aspect of the present disclosure is a method of manufacturing the laser scanning unit. The manufacturing method includes fastening the first end portion of the mirror to the first mirror support portion by a mirror fastener in a state where the mirror specific surface at the first end portion of the mirror is abutted against the pair of protrusion portions. The manufacturing method further includes adjusting the second end portion of the mirror to a target position after the first end portion of the mirror is fastened to the first mirror support portion. The manufacturing method further includes inserting, in a state where the second end portion of the mirror is retained at the target position, a needle between the end surface of the second end portion of the mirror and the concave surface of the second mirror support portion, and filling an adhesive ejected from the needle between the end surface of the second end portion of the mirror and the pair of partitioning surfaces of the second mirror support portion. The manufacturing method further includes releasing the retention of the second end portion of the mirror at the target position after curing the adhesive.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to the drawings. It is noted that the following embodiment is an example of embodying the present disclosure and does not limit the technical scope of the present disclosure.

Figure 1:
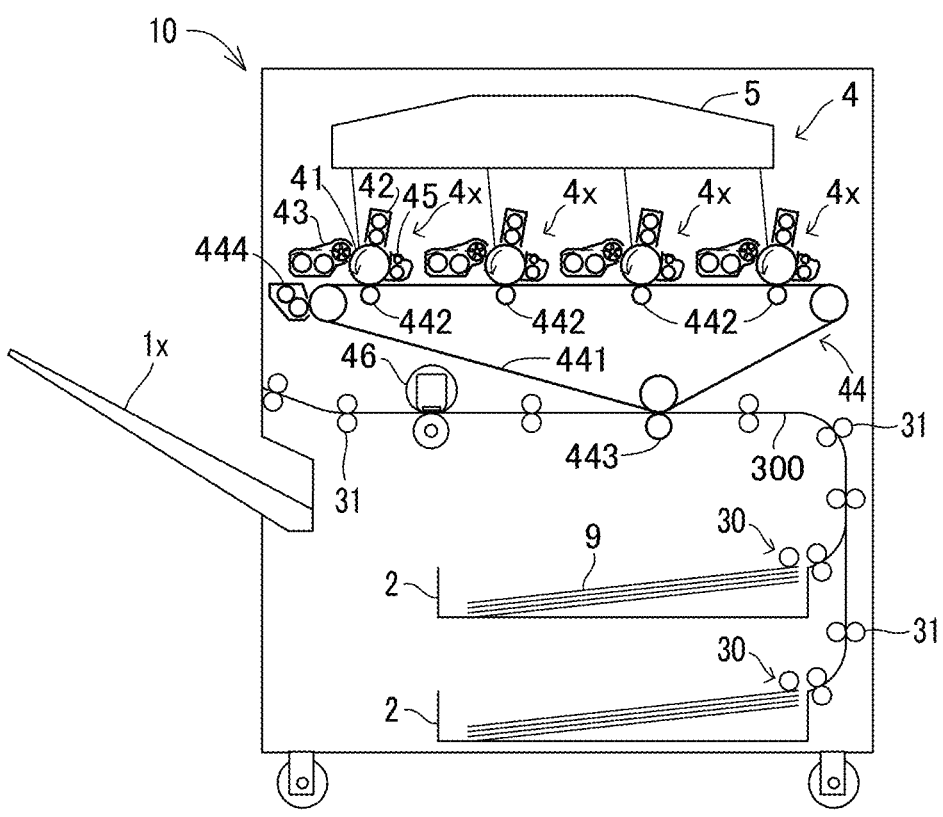
FIG. 1 is a configuration diagram of an image forming apparatus including a laser scanning unit according to an embodiment.

A laser scanning unit 5 according to the embodiment configures a part of an image forming apparatus 10 that uses electrophotography (see FIG. 1).

[Configuration of Image Forming Apparatus 10]

As shown in FIG. 1, the image forming apparatus 10 includes a sheet conveying device 3 and a printing device 4. The image forming apparatus 10 is a tandem-type color image forming apparatus.

The sheet conveying device 3 includes a sheet feed mechanism 30 and a plurality of conveying roller pairs 31. The sheet feed mechanism 30 feeds sheets 9 stored in a sheet storing portion 2 to a conveying path 300. The conveying path 300 is a path for conveying the sheet 9.

The plurality of conveying roller pairs 31 are rotationally driven by a motor (not shown). The plurality of conveying roller pairs 31 rotate to convey the sheet 9 along the conveying path 300 and further discharge the sheet 9 onto a discharge tray 1*x*.

A printing device 4 executes printing processing using electrophotography. The printing processing is processing of forming an image on the sheet 9. The sheet 9 is an image forming medium such as a paper sheet or a sheet-type resin member.

The printing device 4 includes one or a plurality of image forming portions 4*x*. In the present embodiment, the image forming apparatus 10 includes a tandem-type printing device 4. Therefore, the printing device 4 includes a plurality of image forming portions 4*x* respectively corresponding to a plurality of toner colors.

The printing device 4 further includes the laser scanning unit 5, a transfer device 44, and a fixing device 46.

Each of the image forming portions 4*x* includes a drum-type photoconductor 41, a charging device 42, a developing device 43, a drum cleaning device 45, and the like. In other words, the printing device 4 includes a plurality of photoconductors 41, a plurality of developing devices 43, and a plurality of drum cleaning devices 45 respectively corresponding to the plurality of toner colors.

In each of the image forming portions 4*x*, the photoconductor 41 rotates so that the charging device 42 charges a surface of the photoconductor 41. The laser scanning unit 5 scans a plurality of laser light beams onto the respective charged surfaces of the plurality of photoconductors 41. Thus, the laser scanning unit 5 writes an electrostatic latent image on the surface of each of the plurality of photoconductors 41.

The plurality of developing devices 43 respectively supply toner to the surfaces of the plurality of photoconductors 41 to thus develop the electrostatic latent images into toner images. The toner is granular developer. The photoconductor 41 is an example of an image-carrying member which rotates while carrying the toner image.

In the present embodiment, the printing device 4 includes four image forming portions 4*x* respectively corresponding to the toner of four development colors of yellow, cyan, magenta, and black. Accordingly, the printing device 4 includes four photoconductors 41, four developing devices 43, and four drum cleaning devices 45.

Four toner images are respectively formed on the surfaces of the four photoconductors 41. The transfer device 44 transfers the four toner images onto the sheet 9 from the four photoconductors 41.

The transfer device 44 includes an intermediate transfer belt 441, four primary transfer devices 442 respectively corresponding to the four image forming portions 4*x*, a secondary transfer device 443, and a belt cleaning device 444.

The four primary transfer devices 442 respectively transfer the toner images formed on the surfaces of the four photoconductors 41 onto a surface of the intermediate transfer belt 441. Thus, a color toner image obtained by combining the toner images of the four photoconductors 41 is formed on the surface of the intermediate transfer belt 441.

The secondary transfer device 443 transfers the color toner image formed on the intermediate transfer belt 441 onto the sheet 9 at a transfer position on the conveying path 300.

The fixing device 46 heats and pressurizes the color toner image transferred onto the sheet 9. Thus, the fixing device 46 fixes the color toner image onto the sheet 9.

The drum cleaning devices 45 respectively remove waste toner remaining on the surfaces of the photoconductors 41. The belt cleaning device 444 removes the waste toner remaining on the intermediate transfer belt 441.

It is noted that when the image forming apparatus 10 is a monochromatic image forming apparatus, the printing device 4 includes one image forming portion 4*x*. In this case, the primary transfer device 442 transfers the electrostatic latent image onto the sheet 9 from the photoconductor 41.

Figure 2:
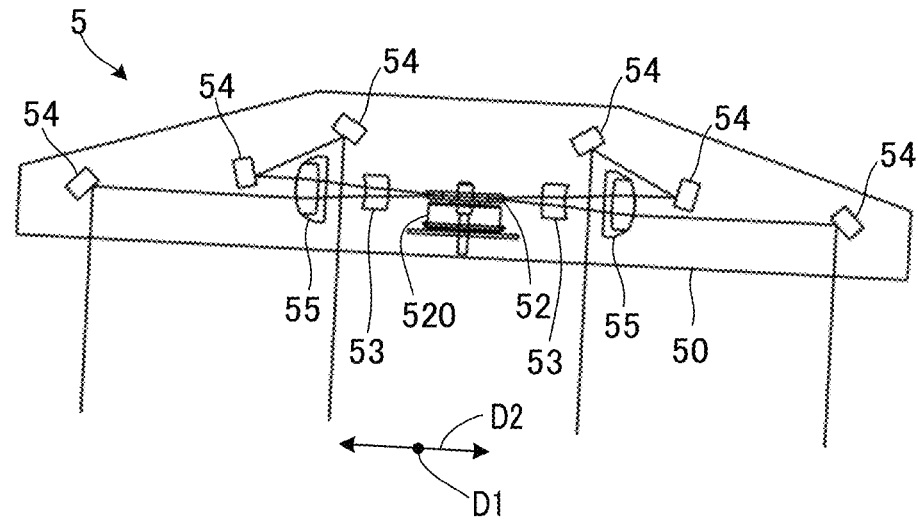
FIG. 2 is a configuration diagram of the laser scanning unit according to the embodiment.

As shown in FIG. 2, the laser scanning unit 5 includes a housing 50, a plurality of light sources (not shown), a laser scanner 52, one or more main lenses 53, a plurality of mirrors 54, and a plurality of sub-lenses 55.

The housing 50 is a molded member formed of a synthetic resin. The plurality of light sources and the laser scanner 52 are arranged inside the housing 50.

The plurality of light sources are laser light sources that each emit laser light. The laser scanner 52 scans the plurality of laser light beams emitted from the plurality of light sources along a first direction D1.

In the present embodiment, the laser scanner 52 is a polygon mirror. The polygon mirror includes a plurality of mirrors arranged in a regular polygon shape in a circumferential direction. The polygon mirror rotates by being driven by a polygon motor 520 (see FIG. 2).

It is noted that a galvanometer mirror or a MEMS mirror (Micro Electro Mechanical Systems mirror) may alternatively be adopted as the laser scanner 52.

The one or more main lenses 53, the plurality of mirrors 54, and the plurality of sub-lenses 55 are attached inside the housing 50 while the first direction D1 is set as the longitudinal direction. In other words, the main lens 53, the plurality of mirrors 54, and the plurality of sub-lenses 55 are arranged inside the housing 50 along the first direction D1.

The plurality of mirrors 54 respectively reflect the plurality of laser light beams. The plurality of laser light beams pass through the main lens 53 and the plurality of sub-lenses 55 and are reflected by the plurality of mirrors 54.

In the present embodiment, the laser scanning unit 5 includes two main lenses 53, two sub-lenses 55, and six mirrors 54.

Each of the main lenses 53 is an fθ lens corresponding to two colors out of the four development colors. Similarly, each of the sub-lenses 55 is also an fθ lens corresponding to two colors out of the four development colors.

The six mirrors 54 include one first mirror corresponding to black, two second mirrors corresponding to cyan, two third mirrors corresponding to magenta, and one fourth mirror corresponding to yellow.

Each of the main lenses 53 causes some of the plurality of laser light beams irradiated onto two photoconductors 41 to pass therethrough. Similarly, each of the sub-lenses 55 also causes some of the plurality of laser light beams irradiated onto two photoconductors 41 to pass therethrough.

The two main lenses 53 include a first main lens corresponding to black and cyan and a second main lens corresponding to yellow and magenta. Similarly, the two sub-lenses 55 include a first sub-lens corresponding to black and cyan and a second sub-lens corresponding to yellow and magenta.

An arrangement accuracy of the plurality of mirrors 54 largely affects an accuracy in writing the four electrostatic latent images respectively corresponding to the four development colors.

Figure 5:
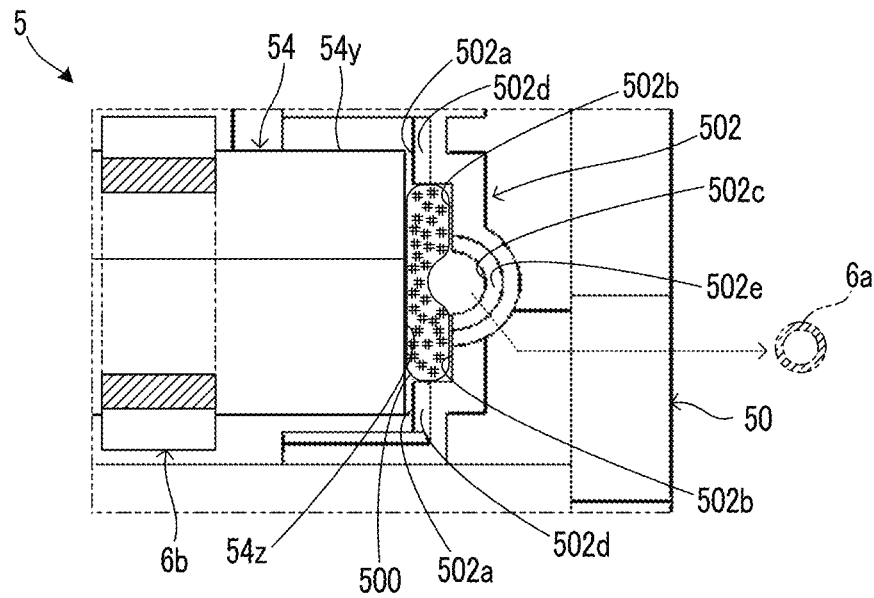
FIG. 5 is a plan view of a support structure of a second end portion of the mirror in the laser scanning unit according to the embodiment.

Incidentally, one of end portions of each of the mirrors 54 may be bonded to the housing 50 by an adhesive 500 (see FIG. 5). Thus, each of the mirrors 54 is firmly fixed to the housing 50. In this case, a necessary and sufficient amount of adhesive 500 needs to be filled between the end portions of the respective mirrors 54 and mirror support portions of the housing 50 for sure.

The laser scanning unit 5 includes a mirror support structure for filling the necessary and sufficient amount of adhesive 500 between the end portions of the respective mirrors 54 and the mirror support portions of the housing 50 for sure. Hereinafter, that structure will be described.

[Mirror Support Structure]

In descriptions below, an end portion of each of the mirrors 54 on a first side D11 of the first direction D1 will be referred to as a mirror first end portion 54*x*, and an end portion on a second side D12 of the first direction D1 will be referred to as a mirror second end portion 54*y* (see FIG. 3 to FIG. 5).

Figure 3:
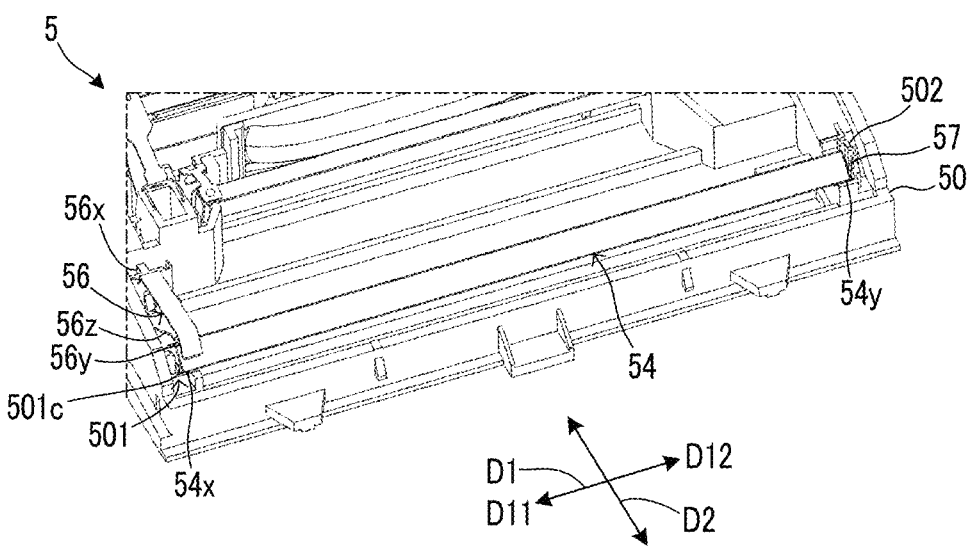
FIG. 3 is a partial perspective view of the laser scanning unit according to the embodiment.
Figure 4:
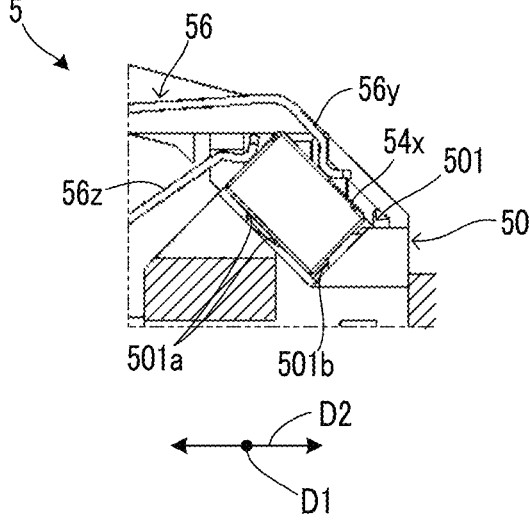
FIG. 4 is a side view of a support structure of a first end portion of a mirror in the laser scanning unit according to the embodiment.

The housing 50 includes a plurality of first mirror support portions 501 and a plurality of second mirror support portions 502 (see FIG. 3 to FIG. 5). Each of the first mirror support portions 501 supports the mirror first end portion 54*x* of the mirror 54. Each of the second mirror support portions 502 supports the mirror second end portion 54*y* of the mirror 54.

The laser scanning unit 5 further includes a plurality of mirror fasteners 56 respectively corresponding to the plurality of mirrors 54 and the adhesive 500 applied to a plurality of positions.

Each of the mirror fasteners 56 is a tool for fastening the mirror first end portion 54*x* of the mirror 54 to the first mirror support portion 501 (see FIG. 3 and FIG. 4). In the present embodiment, each of the mirror fasteners 56 is a metal member.

The adhesive 500 at each position bonds the mirror second end portion 54*y* of the mirror 54 to the second mirror support portion 502. In the present embodiment, the adhesive 500 is an ultraviolet-curing adhesive.

The mirror fasteners 56 each include an engagement portion 56*x*, a first elastic portion 56*y*, and a second elastic portion 56*z* (see FIG. 3). The engagement portion 56*x* is a portion that engages with the housing 50 to fix the mirror fastener 56 to a specific part of the housing 50 (see FIG. 3).

The first elastic portion 56*y* and the second elastic portion 56*z* elastically bias the mirror 54 toward the housing 50. In the present embodiment, the first elastic portion 56*y* and the second elastic portion 56*z* are each a leaf spring.

Each of the first mirror support portions 501 supports two positions of a mirror specific surface at the mirror first end portion 54*x* of the mirror 54 (see FIG. 4). The mirror specific surface is a reflection surface or a surface on the other side of the reflection surface in each of the mirrors 54.

As shown in FIG. 4, each of the first mirror support portions 501 includes a pair of protrusion portions 501*a* that are abutted against the mirror specific surface at the mirror first end portion 54*x*. Each of the first mirror support portions 501 further includes a mirror side surface support portion 501*b* that supports a first side surface of the mirror first end portion 54*x* in each of the mirrors 54 (see FIG. 4).

In each of the first mirror support portions 501, the engagement portion 56*x* engages with a part of the housing 50, the first elastic portion 56*y* elastically biases the mirror first end portion 54*x* toward the pair of protrusion portions 501*a*, and the second elastic portion 56*z* elastically biases the mirror first end portion 54*x* toward the mirror side surface support portion 501*b* (see FIG. 4).

Figure 6:
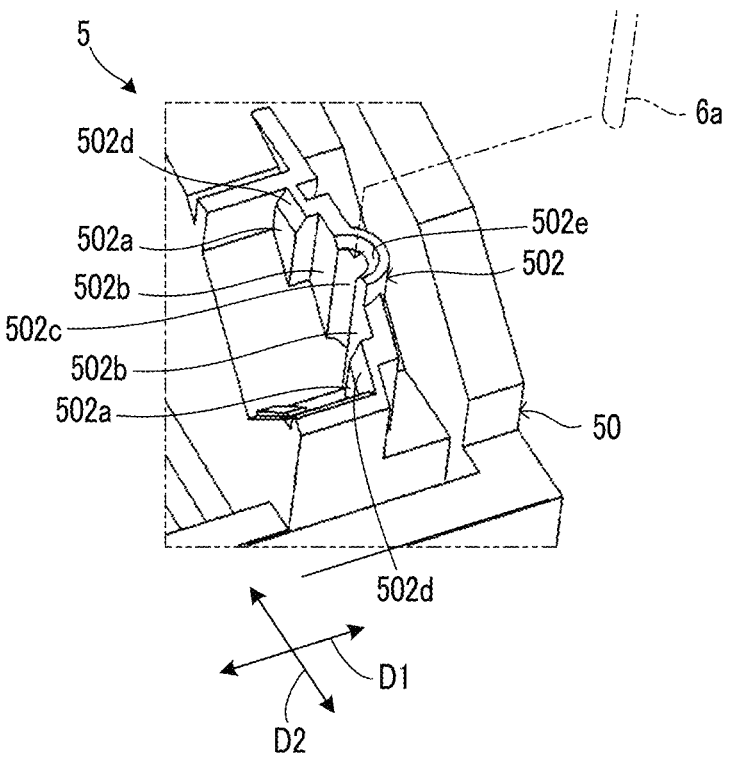
FIG. 6 is a perspective view of a second mirror support portion in the laser scanning unit according to the embodiment.

Meanwhile, each of the second mirror support portions 502 includes a pair of partitioning surfaces 502*b* and a concave surface 502*c* (see FIG. 5 and FIG. 6). Each of the second mirror support portions 502 further includes a pair of restriction surfaces 502*a* (see FIG. 5 and FIG. 6).

The pair of partitioning surfaces 502*b* are formed to oppose an end surface 54*z* of the mirror second end portion 54*y* while an interval is provided between the pair of partitioning surfaces 502*b* and the end surface 54*z*.

The concave surface 502*c* is formed between the pair of partitioning surfaces 502*b*. The concave surface 502*c* opposes the end surface 54*z* of the mirror second end portion 54*y* while an interval larger than that between the pair of partitioning surfaces 502*b* and the end surface 54*z* is provided therebetween.

The pair of restriction surfaces 502*a* are formed on an outer side of the pair of partitioning surfaces 502*b* in an array direction of the pair of partitioning surfaces 502*b* (see FIG. 5 and FIG. 6). In other words, the pair of partitioning surfaces 502*b* are formed between the pair of restriction surfaces 502*a*.

The pair of restriction surfaces 502*a* oppose the end surface 54*z* of the mirror second end portion 54*y* while being closer to the end surface 54*z* than the pair of partitioning surfaces 502*b*. Thus, the pair of restriction surfaces 502*a* restrict a movement of the mirror 54 toward the second side D12 of the first direction D1.

As shown in FIG. 3, the first mirror support portions 501 each include a restriction surface 501*c* that restricts a movement of the mirror 54 toward the first side D11 of the first direction D1.

An interval between the restriction surface 501*c* of the first mirror support portion 501 and the pair of restriction surfaces 502*a* of the second mirror support portion 502 is set in accordance with a molding accuracy of the housing 50 and a size accuracy of each of the mirrors 54.

For example, the interval between the end surface 54*z* of the mirror second end portion 54*y* and the pair of restriction surfaces 502*a* is smaller than 1 millimeter.

Each of the second mirror support portions 502 further includes a pair of mirror guide surfaces 502*d* (see FIG. 5 and FIG. 6). The pair of mirror guide surfaces 502*d* are tapered surfaces that are tilted from the pair of restriction surfaces 502*a* toward the second side D12 of the first direction D1.

When the mirror 54 is inserted between the restriction surface 501*c* and the pair of restriction surfaces 502*a*, the pair of mirror guide surfaces 502*d* guide the mirror second end portion 54*y* to a position along the pair of restriction surfaces 502*a*.

In each of the second mirror support portions 502, the adhesive 500 is filled between the end surface 54*z* of the mirror second end portion 54*y* and the pair of partitioning surfaces 502*b* (see FIG. 5). Thus, the adhesive 500 bonds the end surface 54*z* of the mirror second end portion 54*y* and the pair of partitioning surfaces 502*b* (see FIG. 5).

Figure 8:
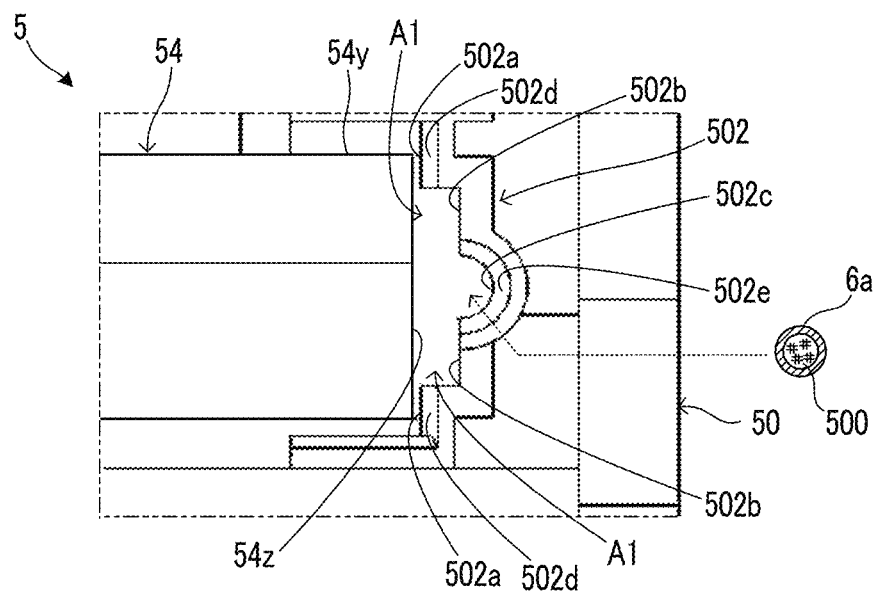
FIG. 8 is a plan view showing a periphery of the second end portion of the mirror before an adhesive is supplied in the laser scanning unit according to the embodiment.

In each of the second mirror support portions 502, a region between the end surface 54z of the mirror second end portion 54y and the concave surface 502c is a region where a needle 6a for ejecting the adhesive 500 can be inserted (see FIG. 8).

An outer circumferential surface of the needle 6a is of a cylindrical shape or a circular cone shape. Therefore, the concave surface 502c is a surface that is curved along the outer circumferential surface of the needle 6a.

Each of the second mirror support portions 502 further includes a needle guide surface 502e (see FIG. 5 and FIG. 6). The needle guide surface 502e is a tapered surface that is tilted from the concave surface 502c toward a direction in which an opening on an inner side becomes larger.

When the needle 6a is inserted to the inner side of the concave surface 502c, the needle guide surface 502e guides the needle 6a to the inner side of the concave surface 502c even when a movement path of the needle 6a is slightly deviated from an assumed path.

[Mirror Attachment Process]

Next, exemplary procedures of a mirror attachment process will be described with reference to the flowchart shown in FIG. 7.

The mirror attachment process is a part of a process of manufacturing the laser scanning unit 5. The mirror attachment process is an example of a process for realizing a manufacturing method of the laser scanning unit 5.

Figure 7:
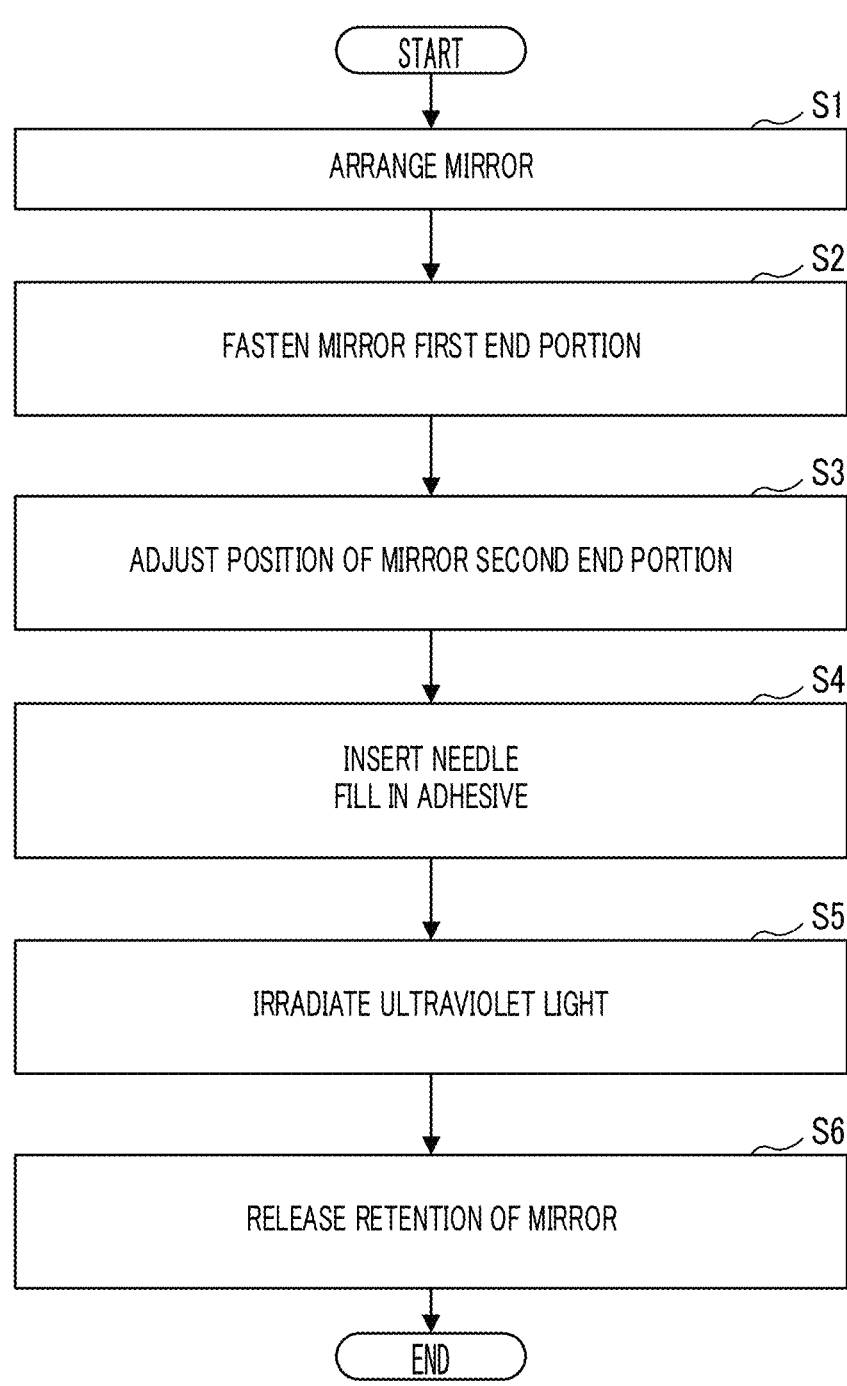
FIG. 7 is a flowchart showing exemplary procedures of a mirror attachment process as a part of a process of manufacturing the laser scanning unit according to the embodiment.

FIG. 7 shows the process executed when one of the plurality of mirrors 54 is attached to the housing 50. The mirror attachment process is executed for each of the mirrors 54.

In descriptions below, S1, S2, . . . represent identification codes of a plurality of steps in the mirror attachment process.

<Step S1>

First, the mirror 54 is arranged at a target position in the housing 50. The target position is a position between the restriction surface 501c of the first mirror support portion 501 and the pair of restriction surfaces 502a of the second mirror support portion 502.

FIG. 8 shows a periphery of the second mirror support portion 502 when the mirror 54 is arranged at the target position in Step S1.

For example, a robot arm grabs the mirror 54 and arranges the mirror 54 at the target position. By executing Step S1, the mirror first end portion 54x is arranged at the first mirror support portion 501, and the mirror second end portion 54y is arranged at the second mirror support portion 502.

<Step S2>

Next, the mirror first end portion 54x of the mirror 54 arranged at the target position is fastened to the first mirror support portion 501 by the mirror fastener 56.

Specifically, the mirror first end portion 54x is fastened to the first mirror support portion 501 by the mirror fastener 56 in a state where the mirror specific surface at the mirror first end portion 54x is abutted against the pair of protrusion portions 501a (see FIG. 4).

For example, while causing the first elastic portion 56y and the second elastic portion 56z of the mirror fastener 56 to be in contact with the mirror first end portion 54x, the robot arm engages the engagement portion 56x of the mirror fastener 56 with a part of the first mirror support portion 501. Thus, the robot arm fastens the mirror first end portion 54x to the first mirror support portion 501 by the mirror fastener 56.

<Step S3>

After the mirror first end portion 54x is fastened to the first mirror support portion 501, the mirror second end portion 54y is adjusted to the target position.

The target position is a position of the mirror second end portion 54y when the laser light reflected by the mirror 54 enters a target line on the surface of the corresponding photoconductor 41.

Figure 9:
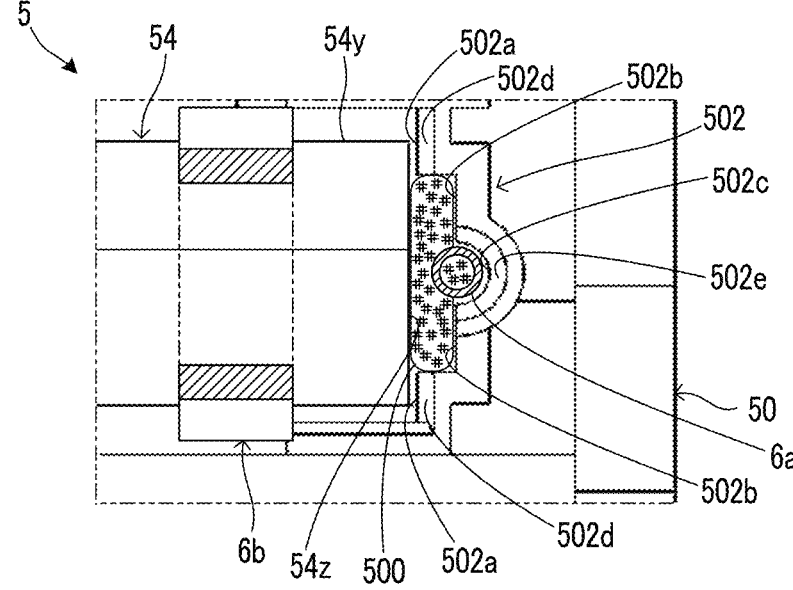
FIG. 9 is a plan view showing the periphery of the second end portion of the mirror when the adhesive is supplied in the laser scanning unit according to the embodiment.

For example, an adjustment jig 6b grabs the mirror second end portion 54y and moves the mirror second end portion 54y along a predetermined adjustment direction so that the laser light reflected by the mirror 54 enters the target line (see FIG. 9).

The adjustment direction is a direction along a circular arc about a straight line that passes through a top portion of the pair of protrusion portions 501a. The adjustment direction is a direction that is basically orthogonal to the reflection surface of the mirror 54.

<Step S4>

Next, in a state where the mirror second end portion 54y is retained at the target position, the needle 6a is inserted between the end surface 54z of the mirror second end portion 54y and the concave surface 502c of the second mirror support portion 502 (see FIG. 9).

In addition, a gel-type adhesive 500 ejected from the needle 6a is filled between the end surface 54z of the mirror second end portion 54y and the pair of partitioning surfaces 502b of the second mirror support portion 502 (see FIG. 9).

For example, the robot arm inserts the needle 6a between the end surface 54z of the mirror second end portion 54y and the concave surface 502c of the second mirror support portion 502.

After the filling with the adhesive 500, the needle 6a is moved outside from between the end surface 54z of the mirror second end portion 54y and the concave surface 502c of the second mirror support portion 502.

The interval between the end surface 54z of the mirror second end portion 54y and the pair of partitioning surfaces 502b is an interval suited for filling in the necessary and sufficient amount of adhesive 500 for the adhesion.

Meanwhile, the interval between the end surface 54z of the mirror second end portion 54y and the pair of partitioning surfaces 502b is insufficient for inserting the needle 6a.

In the present embodiment, the concave surface 502c forms a sufficient space for inserting the needle 6a.

It is noted that when the interval between the end surface 54z of the mirror second end portion 54y and the pair of partitioning surfaces 502b is set to an interval suited for inserting the needle 6a, an inconvenient situation may arise. The inconvenient situation is leakage of the adhesive 500 or a situation where an excessive amount of adhesive 500 becomes necessary.

<Step S4>

Next, in a state where the mirror second end portion 54y is retained at the target position, ultraviolet light is irradiated between the end surface 54z of the mirror second end portion 54y and the pair of partitioning surfaces 502b of the second mirror support portion 502.

For example, the ultraviolet light is irradiated onto the reflection surface of the mirror 54, and the ultraviolet light reflected by the reflection surface is irradiated between the end surface 54z of the mirror second end portion 54y and the pair of partitioning surfaces 502*b* of the second mirror support portion 502.

Step S5 is an example of a step of curing the adhesive.
<Step S6>

After curing the adhesive, the retention of the mirror second end portion 54*y* at the target position is released.

For example, the adjustment jig 6*b* releases grabbing of the mirror second end portion 54*y*.

By executing Step S1 to Step S6, one mirror 54 is firmly attached to the housing 50 with high accuracy.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning unit, comprising:
a housing;
a laser scanner which is arranged inside the housing and scans laser light along a first direction;
a mirror which is arranged inside the housing along the first direction and reflects the laser light;
a mirror fastener which fastens a first end portion of the mirror on a first side of the first direction to a first mirror support portion of the housing; and
an adhesive which bonds a second end portion of the mirror on a second side of the first direction to a second mirror support portion of the housing, wherein
the first mirror support portion includes a pair of protrusion portions which support two positions of a mirror specific surface that is a reflection surface or a surface on an opposite side of the reflection surface at the first end portion of the mirror,
the second mirror support portion includes:
a pair of partitioning surfaces opposing an end surface of the second end portion of the mirror while an interval is provided between the pair of partitioning surfaces and the end surface; and
a concave surface which is formed between the pair of partitioning surfaces and opposes the end surface of the second end portion of the mirror while an interval larger than the interval between the pair of partitioning surfaces and the end surface is provided between the concave surface and the end surface, and
the adhesive bonds the end surface of the second end portion of the mirror and the pair of partitioning surfaces.

2. The laser scanning unit according to claim 1, wherein the second mirror support portion further includes a pair of restriction surfaces which are formed on an outer side of the pair of partitioning surfaces in an array direction of the pair of partitioning surfaces, oppose the end surface of the second end portion of the mirror while being closer to the end surface than the pair of partitioning surfaces, and restrict a movement of the mirror toward the second side of the first direction.

3. The laser scanning unit according to claim 1, wherein the concave surface is a curved surface.

4. The laser scanning unit according to claim 1, wherein the adhesive is an ultraviolet-curing adhesive.

5. A manufacturing method of a laser scanning unit, comprising:
when:
the laser scanning unit includes:
a housing;
a laser scanner which is arranged inside the housing and scans laser light along a first direction; and
a mirror which is arranged inside the housing along the first direction and reflects the laser light;
the housing includes:
a first mirror support portion including a pair of protrusion portions which support two positions of a mirror specific surface that is a reflection surface or a surface on an opposite side of the reflection surface at a first end portion of the mirror on a first side of the first direction; and
a second mirror support portion which supports an end surface of a second end portion of the mirror on a second side of the first direction; and
the second mirror support portion includes:
a pair of partitioning surfaces opposing the end surface of the second end portion of the mirror while an interval is provided between the pair of partitioning surfaces and the end surface; and
a concave surface which is formed between the pair of partitioning surfaces and opposes the end surface of the second end portion of the mirror while an interval larger than the interval between the pair of partitioning surfaces and the end surface is provided between the concave surface and the end surface,
fastening the first end portion of the mirror to the first mirror support portion by a mirror fastener in a state where the mirror specific surface that is the reflection surface or the surface on the opposite side of the reflection surface at the first end portion of the mirror is abutted against the pair of protrusion portions;
adjusting the second end portion of the mirror to a target position after the first end portion of the mirror is fastened to the first mirror support portion;
inserting, in a state where the second end portion of the mirror is retained at the target position, a needle between the end surface of the second end portion of the mirror and the concave surface of the second mirror support portion, and filling an adhesive ejected from the needle between the end surface of the second end portion of the mirror and the pair of partitioning surfaces of the second mirror support portion; and
releasing the retention of the second end portion of the mirror at the target position after curing the adhesive.

6. The manufacturing method of a laser scanning unit according to claim 5, comprising:
when the adhesive is an ultraviolet-curing adhesive, irradiating ultraviolet light onto the reflection surface of the mirror so that the ultraviolet light reflected by the reflection surface is irradiated between the end surface of the second end portion of the mirror and the pair of partitioning surfaces of the second mirror support portion.

* * * * *